United States Patent [19]

Stanton

[11] 4,067,709
[45] Jan. 10, 1978

[54] OPTICAL TRANSMISSION LINE
[76] Inventor: Austin N. Stanton, 4240 Briar Creek Lane, Dallas, Tex. 75214
[21] Appl. No.: 682,365
[22] Filed: May 3, 1976
[51] Int. Cl.² .............................................. C03B 37/00
[52] U.S. Cl. ......................................... 65/3 B; 65/13; 65/60 C; 65/86; 350/96 R; 350/96 WG; 350/96 T; 427/166; 427/250
[58] Field of Search ................... 65/3 B, 3 A, DIG. 7, 65/60 C, 13, 2, 86, 87, 88; 350/96 T, 96 WG, 96 M; 427/166, 250; 264/1; 360/96 R, 96 WG

[56]     References Cited
U.S. PATENT DOCUMENTS

| 3,395,366 | 7/1968 | Snitzer et al. | 65/DIG. 7 |
| 3,440,620 | 4/1969 | French | 350/96 T |
| 3,535,023 | 10/1970 | Yananaka et al. | 65/DIG. 7 |
| 3,558,377 | 1/1971 | Tantillo | 65/4 B X |
| 3,971,645 | 7/1976 | Bachmann et al. | 65/DIG. 7 |

FOREIGN PATENT DOCUMENTS

| 773,059 | 12/1967 | Canada | 65/4 B |

Primary Examiner—Robert L. Lindsay, Jr.
Attorney, Agent, or Firm—J. Patrick Cagney

[57]     ABSTRACT

A flexible hollow glass tube of optical fiber dimensions provides a central light passage and serves as an optical transmission line characterized by substantially less absorption and distortion of signals superposed on transmitted light waves. A metal rod located within a preform evaporates as the preform is heated and drawn, providing a convenient method of reflectively coating the internal surface of small tubes.

3 Claims, 5 Drawing Figures

OPTICAL TRANSMISSION LINE

BACKGROUND OF THE INVENTION

This invention relates to transmission lines for optical waves.

Many types of optical fibers having solid cores of transparent material such as glass or plastics have been developed and are being used as transmission lines for modulated optical waves. Diameters of these optical fibers typically range from a few micrometers to one millimeter. The smaller diameter optical fibers, being quite flexible, are more common and permit many transmission lines to be encabled, thus providing for multiple and/or redundant transmission circuits.

Energy losses due to attenuation in the available fiber optic materials and loss of coherence of the light due to multiple reflections currently limit the useful length of a section of fiber optic transmission line to a kilometer or 2. If longer distances are to be covered, amplification repeaters must be used to raise the signal level before injecting the signal into another section of optical fiber transmission line.

The small dimensions of the optical fibers cause immense problems in coupling with input and output devices, greatly affecting the cost and complexity of the repeaters.

In order to minimize the number of repeaters for a given length transmission line, intensive development work is currently under way both in the area of solid optical fiber technology and in the area of the peripheral devices. The scope of this work includes the use of multi-layered solid fibers to improve coherence and improvements in glass technology which is now approaching the theoretical limits of transparence. Still, others are actively striving to produce plastics capable of equalling the performance of quartz.

While these approaches offer potential improvement in increasing the useful length of optical fiber transmission line sections, the problems and cost of providing amplifiers remain a limiting factor in the commercialization of optical transmission lines for modulated optical waves.

SUMMARY OF THE INVENTION

The present invention seeks to reduce the energy loss and also to reduce the loss of coherence in the case of optical transmission lines for high capacity modulated wave systems, thereby to reduce the number of amplifiers required for such systems. The invention also seeks to improve the coupling of input and output devices to the ends of optical transmission line systems.

More specifically, the invention provides an optical transmission line comprising a flexible elongate hollow tube of ductible material having an interior surface coating of light reflecting material defining a central light passage characterized by low attenuation.

In the preferred form, the flexible tube is of glass and has an intermediate portion of fiber optical diameter and has end portions of enlarged diameter for convenience in coupling. The interior surface coating is of metal and covers both the intermediate portion and the end portions of the hollow tube. As a further feature, each end portion is provided with a lenticular closure disc to prevent changes in characteristics due to occluded gases ambient in the production facility and to focus entering and emergent beams.

The invention also provides a process of continuously drawing heated ductible tubing material in encircling heat radiating relation to an internal source of light reflecting evaporable material, to produce a hollow tube having an internal surface coating of light reflecting material.

Most specifically, the invention provides for heating a narrow zone of a preform glass tube and continuously drawing the material at the heated zone into a small diameter tube. Internal radiation from the heated zone of glass melts an internally supported metal rod at a rate sufficient to condense metallic vapor on the inner surface of the tube as it is drawn to the required small diameter. The length of the drawn tube is determined by the supply of glass furnished by the preform tube. The size of the drawn tube is determined by the rate of heat flow into the glass, the heat loss by radiation and convection, the speed of drawing and the composition of the glass.

Other features and advantages of the invention will be apparent from the following description and claims and are illustrated in the accompanying drawings which show structure embodying features of the present invention and the principles thereof.

BRIEF DESCRIPTION OF THE DRAWINGS

In the accompanying drawings forming a part of the specification, and in which like numerals are employed to designate like parts throughout the same.

DESCRIPTION OF PREFERRED EMBODIMENT

Figure 3:
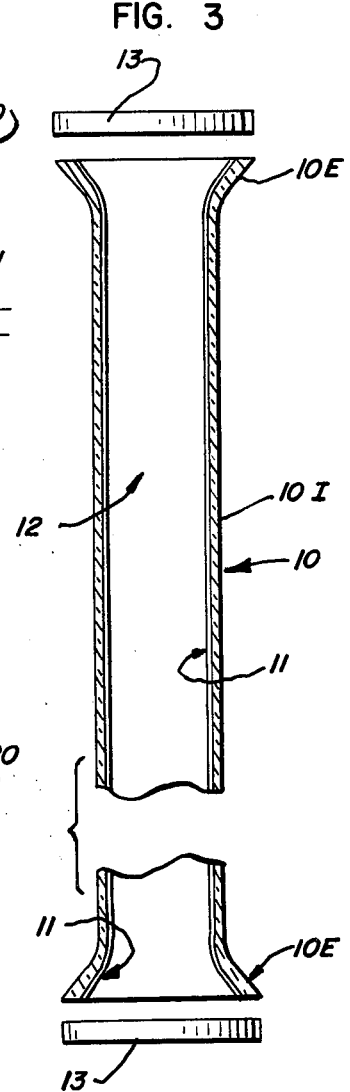
FIG. 3 is an exploded section showing the final form of the optical transmission line, with portions thereof broken away.

Referring now to the drawings, a completed section of optical transmission line is illustrated in FIG. 3 wherein the final form of the presently preferred embodiment of an optical transmission line in accordance with this invention is shown to comprise a flexible elongate hollow tube 10 of glass, or other suitable ductible material, having an interior surface coating 11 of metal or other light-reflecting material defining a central light passage 12 characterized by low attenuation.

In the illustrated embodiment, the hollow tube has an intermediate portion 10 I of small diameter and of predetermined length in accordance with the requirements for the particular optical transmission line application. The intermediate portion merges at each end with an enlarged diameter end portion 10 E of bell-like form to facilitate coupling to input and output optical devices. Preferably the light-reflecting material 11 completely coats the entire interior surface of the intermediate portion and of each end portion 10 E. Closures 13 in the form of lenticular discs of glass are shown for each end portion in the exploded view of FIG. 3. The closures 13 are not essential, but can serve to maintain the original vacuum or gas filled condition. Ideally, manufacture of the glass and of the transmission lines in the clean and high vacuum conditions of space would significantly reduce the amount of occluded and adsorbed gas, and subsequent degasing of the glass. The lenticular glass discs 13 may also serve as functional elements of the optical systems.

In accordance with the invention, the optical transmission line section of FIG. 3 may be utilized wherever optical fiber transmission lines are employed. Typically the diameters of optical fibers range from a very few micrometers to as much as 1 millimeter, however, the flexibility and the encabling requirements make it desirable to utilize small diameter optical transmission lines wherever possible. Considerations of coherence suggest very small diameter optical transmission lines to reduce the diversity of light path lengths therein due to the different number of reflections encountered by different light rays.

For purposes of illustrative disclosure, a table giving typical ranges of dimensions, based on the present state of the art, is given for the optical transmission line section shown in FIG. 3.

|  | RANGE | |
|---|---|---|
| ID of intermediate portion 10 I | 0.5 | 100 microns |
| Wall thickness of intermediate portion 10 I | 0.1 | 10 microns |
| Thickness of metal coating 11 | 0.05 | 1 micron |
| ID of end portion 10 E | 0.1 | 10 mm |
| Wall thickness of end portion 10 E | 0.01 | 1 mm |

In terms of the current state of the art, it is commonly accepted that transmission through optical fibers is practical if attenuation due to energy loss is held to about 20 db per kilometer. This loss limits the useful length of optical fiber transmission lines to 1 or 2 kilometers. The theoretical lower limit for solid core optical fibers of glass is an attenuation of 2 db per kilometer, which would permit repeater stations to be spaced as much as 10 miles as compared with 2-mile spacing commonly required for coaxial cable transmission lines.

It should be noted that the hollow tube optical transmission line of this invention substantially lowers the theoretical limit of attenuation and in the smaller sizes, can also minimize loss of coherence due to multiple reflections along the light path.

The art of drawing glass fibers and glass tubes is quite diverse and well known and the present invention contemplates use of any of the known methods for heating a zone of a preform glass tube to permit drawing the preform tube into a tube of small diameter and appropriate length. Any other method such as drawing from an aperture in the bottom of a crucible, is contemplated within the scope of this invention if it produces the desired final tubular line configuration.

Figure 1:
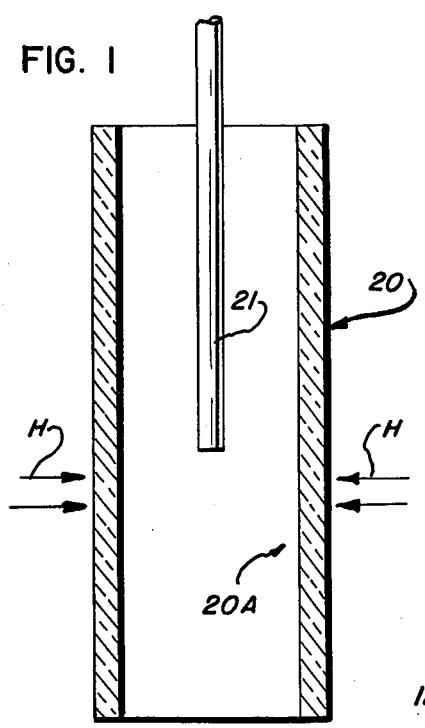
FIG. 1 is a lengthwise section showing a preform glass tube having a metal rod placed centrally therein.
Figure 2:
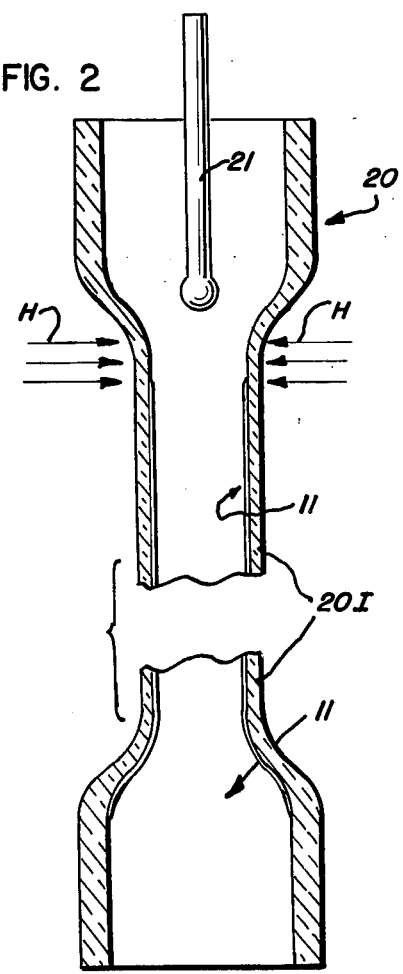
FIG. 2 is a corresponding section, with portions broken away, showing the glass tube being drawn and the rod partly melted during the process of making the optical transmission line.

By way of example, one method for practicing the invention is illustrated in the sequence views of FIGS. 1 and 2, wherein a thick-walled preform glass tube 20 is shown with an annular narrow zone 20 A subjected to a source of heat as represented by the arrows H. A metal rod 21 placed centrally in the preform tube 20 is located in a relationship to the heated annular zone 20 A to permit heat re-radiated from the inside wall of the preform tube to effect controlled melting of the tip of the metal rod, during the drawing of the preform tube into its final small diameter form.

The rod 21 may be of a metal such as silver or aluminum to have a melting point substantially below that of the glass preform tube 20. Typically, for the arrangement ilustrated in FIG. 1, thhe rod 21 may have a diameter of 0.001 to 2 mm and the preform tube 20 may have an ID of 1 to 10 mm and a wall thickness of 0.1 to 10 mm, in order that the rod 21 may vaporize at a rate to supply sufficient condensate to completely coat the interior of the drawn tube.

As the process proceeds, as shown in FIG. 2, the metal rod 21 is progressively consumed and the heated material of the preform tube 20 is progressively drawn until its intermediate portion 20 I is of prescribed length which, is some instances, may be of many kilometers. As is apparent from a comparison of FIGS. 1 and 2, the source of heat is progressively moved relative to the upper end of the preform glass tube as the tube drawing and rod vaporizing process is continued. Upon the completion of the drawing operation, the ends of the preform glass tube are cut off to provide the coupling bells 10 E shown in FIG. 3.

Coatings deposited by vapor deposition as described herein are inclined to be grainy and where a minimum thickness coating 11 is desired, the desired continuity of the coating may be impaired. Where necessary, the coated tube 10 may be reheated following the drawing and coating operations to flow the coating material.

Any other method of injecting metal into the heated zone of the glass tube for the purpose of vaporizing the metal to form the internal reflective coating may be employed. Injection of a stream of finely divided metallic powder may also be used. The specific examples given herein are not intended to limit the scope of the invention.

The metal rod or powder may incorporate a "getter" material, mixed with the base metal to absorb any gas in the system.

It should be noted, from the dimensions given herein by way of example, that the dimeter relationships and the angles of taper, as shown herein are not necessarily to scale. The angle formed by the sides of the tapered portion is consistent with good glass fiber drawing practice and by the expected angular dispersion of the injected signal rays. The greater the angle, the more of the undesirable high angle rays will be rejected by reflection against the coupling bell walls.

Figure 4:
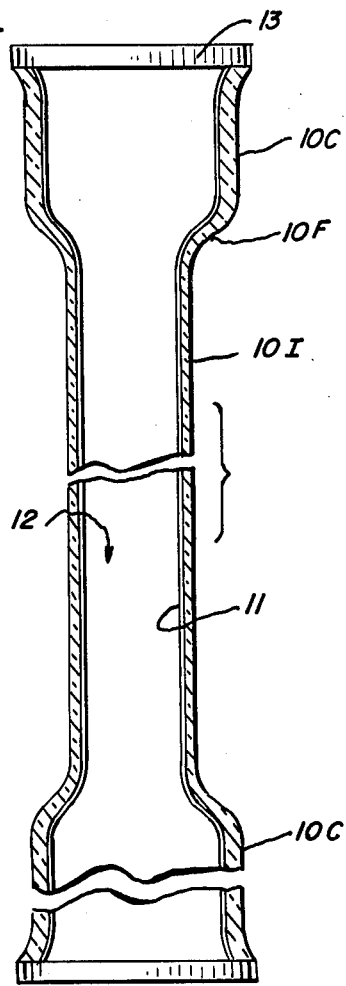
FIGS. 4 and 5 are lengthwise sections showing alternative embodiments of optical transmission lines, with portions thereof broken away.

Another embodiment of an optical transmission line as shown in final form in FIG. 4 consists of a main length intermediate portion 10 I merging at each end with a gradually tapered flared portions 10 F, each of which merges with a cylindrical end portion 10 C that is sealed by a closure lens 13. The FIG. 4 configuration is produced by drawing the preform at different rates selected to provide accurate diameter and wall thickness control. The cylindrical portion may alternatively be drawn from the preform and re-drawn by secondary heating to fiber dimensions.

Figure 5:
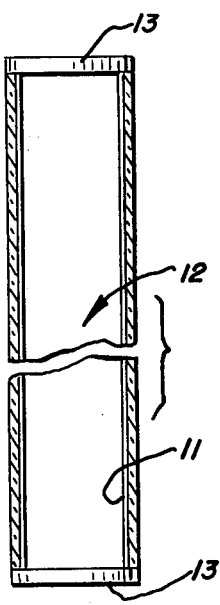

While the embodiments of FIGS. 3 and 4 utilize enlarged ends to facilitate coupling the invention also contemplates a uniform diameter transmission line tube 10 T having a full length reflective internal coating 11 and having closure lens 11 as shown in FIG. 5.

The terms "optical" and "light" as herein used are understood to include electromagnetic waves above and below the wavelengths visible to the eye.

In summary, it should be noted that internally coated flexible hollow tubes as described herein define a central light passage of vacuum, air or gas that exhibits high transparency and greatly reduces the attentuation losses and coupling problems currently encountered in fiber optic transmission lines.

Thus, while preferred constructional features of the invention are embodied in the structure illustrated herein, it is to be understood that changes and variations may be made by those skilled in the art without departing from the spirit and scope of the appended claims.

What is claimed is:

1. A process of continuously drawing heated preform glass tube in encircling heat radiating relation to an internal source of light reflecting evaporable metal rod to produce a hollow tube having an internal surface coating of light reflecting material drawn simultaneously with the tube.

2. A process as defined in claim 1 wherein heat is applied to an intermediate annular zone of the preform glass tube to provide the hollow tube with end portions of larger diameter than its intermediate length portion.

3. A method of making an optical transmission line comprising maintaining a large diameter annular zone of a preform glass tube at drawing temperature, supporting a rod of evaporable light reflecting metal rods within the annular zone, evaporating the light reflecting material while drawing the ductile glass from the annular zone into a hollow tube to provide an internal light reflective coating on the tube drawn simultaneously therewith.

* * * * *

UNITED STATES PATENT AND TRADEMARK OFFICE
CERTIFICATE OF CORRECTION

PATENT NO. : 4,067,709
DATED : January 10, 1978
INVENTOR(S) : Austin N. Stanton

It is certified that error appears in the above-identified patent and that said Letters Patent are hereby corrected as shown below:

Claim 3, line 4, delete "rods" and substitute -- rod -- ; and

Claim 3, line 8, after "tube" insert -- and -- .

Claim 3, line 6, "material" should read -- metal rod --.

Signed and Sealed this

Twenty-seventh Day of June 1978

[SEAL]

Attest:

RUTH C. MASON
Attesting Officer

DONALD W. BANNER
Commissioner of Patents and Trademarks